J. W. GAMBLE.
SUCTION METER.
APPLICATION FILED JULY 31, 1914.

1,202,050.

Patented Oct. 24, 1916.
2 SHEETS—SHEET 1.

WITNESSES

INVENTOR
BY
ATTORNEY

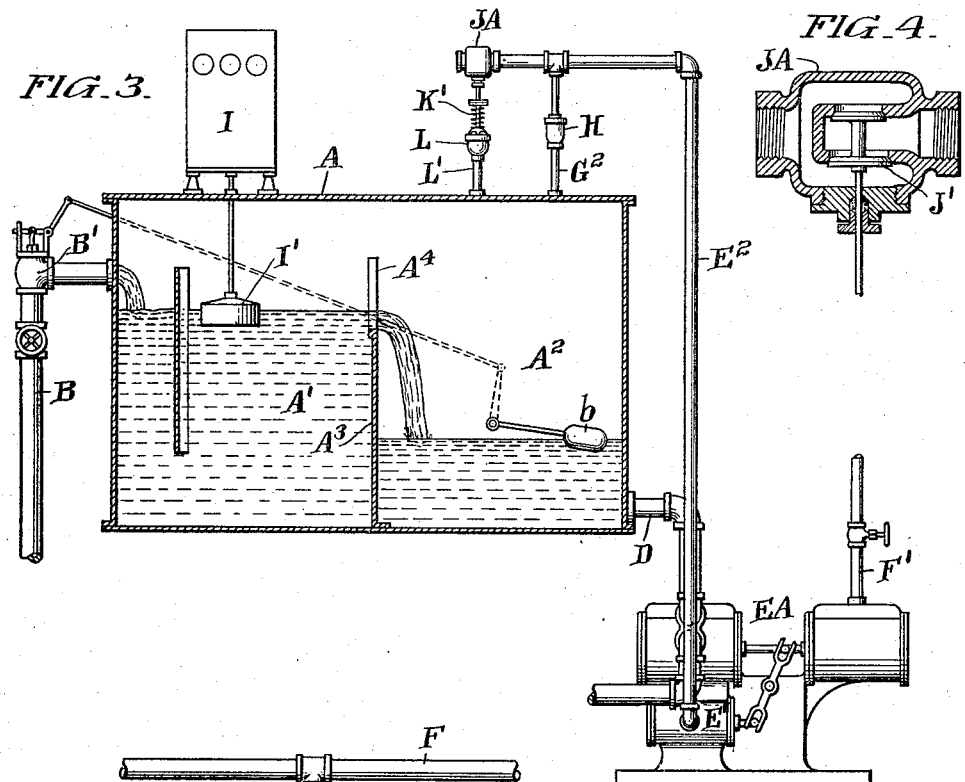
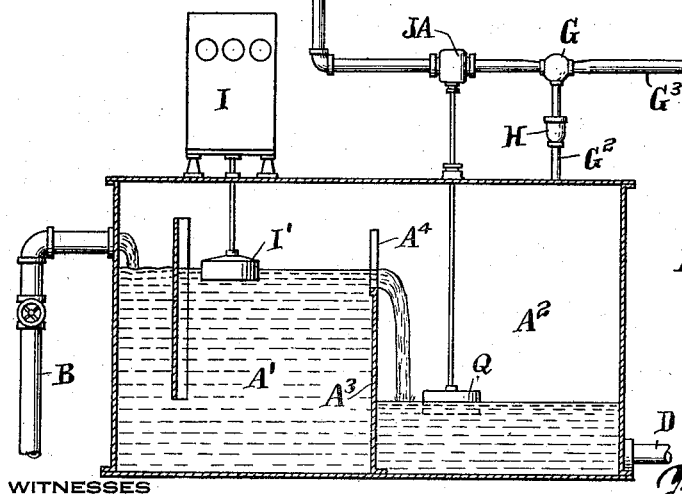

UNITED STATES PATENT OFFICE.

JOSEPH W. GAMBLE, OF PHILADELPHIA, PENNSYLVANIA, ASSIGNOR TO JOSEPH S. LOVERING WHARTON, WILLIAM S. HALLOWELL, AND JOHN C. JONES, ALL OF PHILADELPHIA, PENNSYLVANIA, DOING BUSINESS UNDER THE FIRM-NAME OF HARRISON SAFETY BOILER WORKS.

SUCTION-METER.

1,202,050.          Specification of Letters Patent.      Patented Oct. 24, 1916.

Application filed July 31, 1914. Serial No. 854,235.

*To all whom it may concern:*

Be it known that I, JOSEPH W. GAMBLE, a citizen of the United States of America, residing in the city and county of Philadelphia, in the State of Pennsylvania, have invented certain new and useful Improvements in Suction-Meters, of which the following is a true and exact description, reference being had to the accompanying drawings, which form a part thereof.

My present invention relates to flow measuring apparatus, in which the rate of flow of a fluid is determined from the varying accumulation of liquid on the supply side of a weir over which the liquid to be measured flows; and the purpose of my invention is to provide simple and effective means whereby the weir chamber may be made a part of the suction line through which a boiler feed or other pump draws water from a well or reservoir in which the water level is located below the level of flow over the weir.

The various features of novelty characterizing my invention are pointed out with particularity in the claims annexed to and forming a part of this specification. For a better understanding of the invention, however, and of the advantages possessed by it, reference should be had to the accompanying drawings and descriptive matter in which I have illustrated and described the best forms of my invention now known to me.

Figure 1:
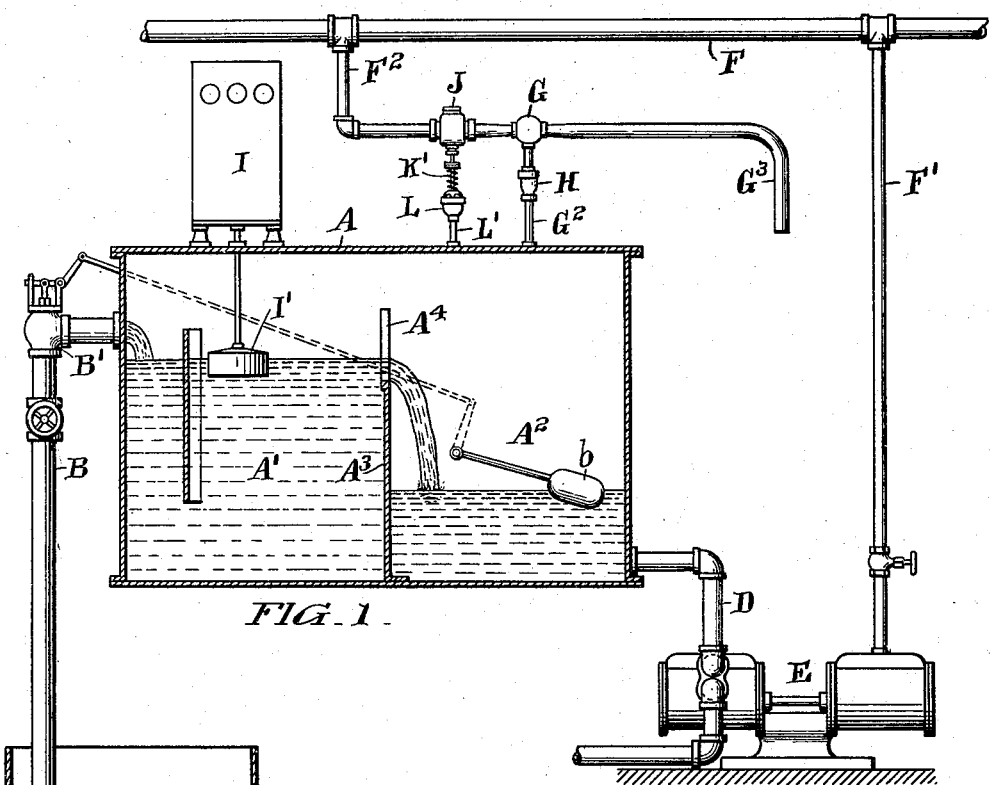
Figure 2:
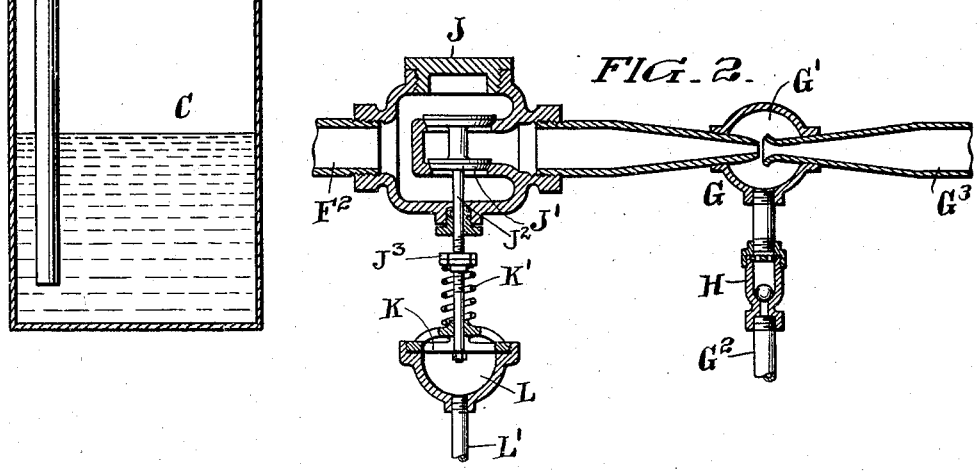

Of the drawings: Figure 1 is a somewhat diagrammatic elevation with parts broken away and in section, of apparatus embodying my invention; Fig. 2 is a sectional elevation, on a larger scale than Fig. 1, of a portion of the apparatus shown in Fig. 1; Fig. 3 is a view taken similarly to Fig. 1, showing a slightly modified form of apparatus; Fig. 4 is a sectional elevation of a valve employed in the apparatus of Figs. 3 and 5; and Fig. 5 is a view taken similarly to Fig. 1, showing still another modification.

In the drawings, and referring first to Figs. 1 and 2, A represents the weir tank, divided into an inlet compartment $A'$ and an outlet compartment $A^2$, by a partition $A^3$, which is formed at its upper edge with one or more weir notches $A^4$. Liquid passes into the inlet compartment $A'$ through a supply pipe B, which, as shown, leads from a well or reservoir C in which the height of water level is substantially below the normal water level in the compartment $A'$ of the weir tank. A valve $B'$, controlled by a float $b$ in the outlet compartment $A^2$, is opened and closed by the float accordingly as the water level in the compartment $A^2$ falls below and rises to a predetermined level. The water passing through the weir tank is withdrawn from the latter through the outlet connection D by a pump E, which may deliver the water directly to a boiler or a closed water heater, or to some other means or place for utilizing or disposing of the water.

I represents the mechanism for indicating, integrating or recording the flow through the weir tank, and the actuating member of this mechanism is a float $I'$, located within the inlet compartment $A'$ of the tank.

F represents the steam supply pipe, from which steam passes through the branch pipe $F'$ to the steam cylinder of the pump E. A second branch pipe $F^2$ from the steam pipe F leads to the steam inlet of an ejector G. The mixing chamber $G'$ of the ejector is connected by the pipe $G^2$ to the interior of the tank A at the top of the latter.

H represents a ball check valve preventing flow from the chamber $G'$ toward the tank A, but opening to permit a flow in the opposite direction. The discharge nozzle from the ejector G is connected to a discharge pipe $G^3$, which may lead to waste. The flow of steam through the pipe $F^2$ to the ejector G is governed by a valve J, which, as shown, has a movable balanced valve member $J'$, the stem $J^2$ of which is connected to a diaphragm K. The latter closes the upper end of a chamber L, which is connected by a pipe $L'$ to the interior of the tank A at the top of the latter. A spring $K'$ acting between the spider-like nut which clamps the diaphragm K in place, and the nuts $J^3$ on the threaded stem $J^2$ of the valve J, supplements the action of the pressure against the under side of the diaphragm K in tending to move the valve member J' up from its seat. The lifting of the valve member J' off its seat permits the steam to pass from the pipe F² into the ejector G. The latter, thereupon, operates to withdraw air from the tank A, and thus to establish a pressure in the latter below that of the atmosphere. As the pressure in the tank A decreases, there is an increasing differential between the downward pressure of the atmosphere on the upper side of the diaphragm K and the pressure within the latter. When this differential exceeds the pressure exerted by the spring K', the valve member J' is pulled down against its seat, thus reducing or interrupting the operation of the ejector G. The minus pressure maintained in the tank A is thus controlled by the tension of the spring K', which may be adjusted by means of the nuts J³. It will be understood, of course, that the tension of the spring K' is so adjusted as to insure the proper minus pressure in the tank A to cause water to be forced by atmospheric pressure from the reservoir C through the pipe B into the tank A at a sufficiently rapid rate.

In lieu of employing a jet ejector as the vacuum producing device, the steam pump EA for withdrawing water from the weir tank may have connected thereto an air cylinder E', as shown in Fig. 3. With this form of my invention, the pressure in the tank A may be controlled by a pressure responsive valve JA, generally similar to the valve J of Figs. 1 and 2, and operated by similar means. The valve JA, however, as shown in Fig. 4, opens on a downward movement of the diaphragm K' corresponding to a decrease of pressure in the tank A, and the valve JA is employed to admit atmospheric air into the pipe E² connecting the air pumping cylinder E' to the tank A. By the adjustment of the operating means for the valve JA, the proper vacuum may be maintained in the tank A, for when the valve JA is closed, the full capacity of the air cylinder E' is utilized in withdrawing air from the tank, but when the vacuum rises higher than is desired in the tank A, the valve JA admits air to the pipe E², thus increasing the pressure in the latter, whereupon the ball valve H closes, in effect disconnecting the tank A from the pipe E². The admission of air to the pump cylinder E', when the vacuum creating action of the latter is not needed, obviously reduces the power then required to operate the pump.

Instead of maintaining a predetermined vacuum in the tank A and controlling the accumulation of water therein by a float actuated valve B' in the inlet pipe B, as in Figs. 1 and 3, this valve may be omitted, and the vacuum regulated by a float in the outlet compartment of the weir tank as required to insure the proper supply of water to the tank. One arrangement operating in this manner is illustrated in Fig. 5. The apparatus shown in Fig. 5 differs from that shown in Fig. 1 essentially only in the omission of the valve B' and float b, and in the substitution for the valve J and its operating means employed in Fig. 1, of the valve JA of Fig. 4 and operating means therefor consisting of a float Q located in the outlet compartment A² of the weir tank and connected to the valve member J' of the valve J.

With the arrangement shown in Fig. 5, a decrease in the height of water level in the chamber A² will lower the float Q, and open the valve JA, whereupon a higher vacuum will be drawn in the tank, and this, of course, tends to increase the rate at which water is sucked into the tank A through the pipe B. The water passing into the tank always carries some air with it which is liberated in the tank, thus tending to lower the vacuum, and furthermore, an undue rise in the height of water level in the compartment A² decreases the vacuum in the tank A by compressing the air above the water in the tank A. With properly designed apparatus of the character shown in Fig. 5, therefore, no special provisions are ordinarily necessary to prevent the tank A from flooding on a sudden decrease in the rate at which water is being withdrawn from the tank.

While in accordance with the provision of the statutes, I have illustrated and described the best forms of my invention now known to me, it will be apparent to those skilled in the art that changes may be made in the forms of apparatus disclosed without departing from the spirit of my invention, and that under some conditions certain features of my invention may be used without a corresponding use of other features.

Having now described my invention, what I claim as new and desire to secure by Letters Patent, is:

1. In a liquid measuring system, the combination with a closed weir chamber of means for withdrawing the measured liquid therefrom, a suction pipe through which the liquid to be measured is sucked into said chamber and means for maintaining a regulated vacuum in the air space of said chamber.

2. In a liquid measuring system, the combination of a closed weir chamber, a source of liquid, a suction pipe connecting said source to said chamber, means for withdrawing liquid from said chamber and means responsive to the pressure in the air space of said chamber for withdrawing air from said chamber as required to maintain said pressure at a predetermined value less than atmospheric.

3. In a liquid measuring system, the combination of a closed weir chamber, a source of liquid, a suction pipe connecting said source to said chamber, means for withdrawing liquid from said chamber, means responsive to the pressure in the air space of said chamber for withdrawing air from said chamber as required to maintain said pressure at a predetermined value less than atmospheric and means responsive to the accumulation of liquid in said chamber for regulating the flow through said suction pipe.

JOSEPH W. GAMBLE.

Witnesses:
D. STEWART,
JOHN E. HUBBELL.